(12) United States Patent
Feinberg (10) Patent No.: US 12,052,116 B1
(45) Date of Patent: Jul. 30, 2024

(54) METHODS FOR ARBITRATING THE ROLE OF BUS MASTER AMONG A PLURALITY OF HOST DEVICES

(71) Applicant: Persimmons, Inc., Newport Beach, CA (US)

(72) Inventor: Eugene M. Feinberg, San Jose, CA (US)

(73) Assignee: Persimmons, Inc., Newport Beach, CA (US)

( * ) Notice: Subject to any disclaimer, the term of this patent is extended or adjusted under 35 U.S.C. 154(b) by 0 days.

(21) Appl. No.: 18/620,614

(22) Filed: Mar. 28, 2024

(51) Int. Cl.
*H04L 41/5054* (2022.01)
*H04L 12/40* (2006.01)
*H04L 47/80* (2022.01)

(52) U.S. Cl.
CPC .. *H04L 12/40019* (2013.01); *H04L 12/40084* (2013.01); *H04L 47/801* (2013.01)

(58) Field of Classification Search
CPC ............. H04L 47/801; H04L 12/40019; H04L 12/40084
See application file for complete search history.

(56) References Cited

U.S. PATENT DOCUMENTS

| | | | |
|---|---|---|---|
| 8,155,032 B2 | 4/2012 | Lindoff et al. | |
| 9,911,465 B1* | 3/2018 | Camarota | ........... H01L 25/0652 |
| 10,410,694 B1* | 9/2019 | Arbel | ..................... G06F 3/0658 |
| 2008/0313698 A1* | 12/2008 | Zhao | ................... H04W 12/069 |
| | | | 709/228 |
| 2013/0111123 A1* | 5/2013 | Thayer | .................. G06F 3/0671 |
| | | | 711/105 |
| 2018/0047663 A1* | 2/2018 | Camarota | ............... H01L 25/18 |
| 2019/0114265 A1* | 4/2019 | Chang | ................. G06F 13/1689 |
| 2019/0140811 A1* | 5/2019 | Abedini | .................... H04B 7/04 |
| 2019/0140813 A1* | 5/2019 | Abedini | ............. H04W 52/343 |
| 2024/0048350 A1* | 2/2024 | Ibrahim | .................... H04L 5/16 |

OTHER PUBLICATIONS

Bailey, Brian, "HBM Takes On A Much Bigger Role", Semiconductor Engineering, May 13, 2021, downloaded from: https://semiengineering.com/hbm-takes-on-a-much-bigger-role/#:~:text=High-bandwidth%20memory%20is%20getting, to%20a%20completely%20different%20level., 15 pgs.
McLellan, Paul, "HBI, a New Standard to Connect Your Chiplets", Cadence, Dec. 11, 2020, downloaded from: https://community.cadence.com/cadence_blogs_8/b/breakfast-bytes/posts/hbi-a-new-standard-to-connect-your-chiplets, 8 pgs.

* cited by examiner

*Primary Examiner* — Abdelnabi O Musa
(74) *Attorney, Agent, or Firm* — Ascenda Law Group, PC (57) ABSTRACT

A first and second host device are configured to communicate data via a data channel (e.g., a half-duplex channel). A control channel (e.g., a full-duplex channel) may be used to arbitrate the dynamic assignment of the respective roles of master and slave to the first and second host devices. The arbitration procedure may include transmitting a first message from the first host device to the second host device that specifies information for allocating one or more time slots to the first host device, and transmitting a second message from the second host device to the first host device that specifies information for allocating one or more time slots to the second host device. At each of the first and second host devices, a communication schedule for the data channel may be determined based on a rule set, the first message and the second message.

13 Claims, 9 Drawing Sheets

METHODS FOR ARBITRATING THE ROLE OF BUS MASTER AMONG A PLURALITY OF HOST DEVICES

FIELD OF THE INVENTION

The present invention relates to methods for arbitrating the role of bus master among a plurality of host devices for communication over a data channel, and more particularly relates an arbitration scheme that employs a control (sideband) channel that is separate from the data channel.

BACKGROUND

In a networked arrangement of host devices, an asymmetric communication model may be employed in which one of the host devices is assigned the role of master and controls the other host devices which are assigned the role of a slave. Other names for the master-slave relationship may include master-responder, manager-worker, leader-follower, etc. In typical asymmetric communication models, only the master is allowed to send requests, while the slave is tasked with responding or servicing the requests of the master. As a result of a master-slave relationship being established over the networked arrangement of host devices, the occurrence of contentions over a shared data bus (i.e., a communication pathway shared by the host devices) may be minimized. Described herein are techniques for efficiently arbitrating the role of master and slave among two or more communicatively coupled host devices.

SUMMARY OF THE INVENTION

In accordance with one embodiment of the invention, a first and second host device are configured to communicate data via a data channel (e.g., a half-duplex channel). A control channel (e.g., a full-duplex channel) may be used to arbitrate the dynamic assignment (i.e., an assignment that may change over time) of the role of bus master to one of the first and second host devices.

Prior to communication over the data channel, the first and second host devices may establish a common time reference via the control channel during a link establishment phase. An arbitration phase may follow the link establishment phase, during which first and second messages may be exchanged between the first and second host devices via the control channel. The first message may specify information for allocating one or more time slots to the first host device with respect to the common time reference during which the first host device will act as a bus master while communicating with the second host device via the data channel. The second message may specify information for allocating one or more time slots to the second host device with respect to the common time reference during which the second host device will act as the bus master while communicating with the first host device via the data channel. Based on a set of rules accessible to both the first host device and the second host device, the first message and the second message, a communication schedule may be determined at each of the first and second host devices that defines one or more time slots allocated to the first host device and one or more time slots allocated to the second host device that do not temporally overlap with the one or more time slots allocated to the first host device. During a data communication phase following the arbitration phase, the first host device and the second host device may communicate data via the data channel in accordance with the communication schedule.

In accordance with one embodiment of the invention, a method for communicating between a first host device and a second host device may include, during a first time period, the first host device and the second host device negotiating, via a control channel, a first communication schedule for bidirectional communication over a data channel. The method may further include, during a second time period following the first time period, communicating first data between the first host device and the second host device via the data channel in accordance with the first communication schedule. While the first and second host devices are communicating the first data in accordance with the first communication schedule during the second time period, the first and second host devices may negotiate, via the control channel, a second communication schedule for bidirectional communication over the data channel. The method may further include, during a third time period following the second time period, the first and second host devices communicating second data via the data channel in accordance with the second communication schedule.

These and other embodiments of the invention are more fully described in association with the drawings below.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
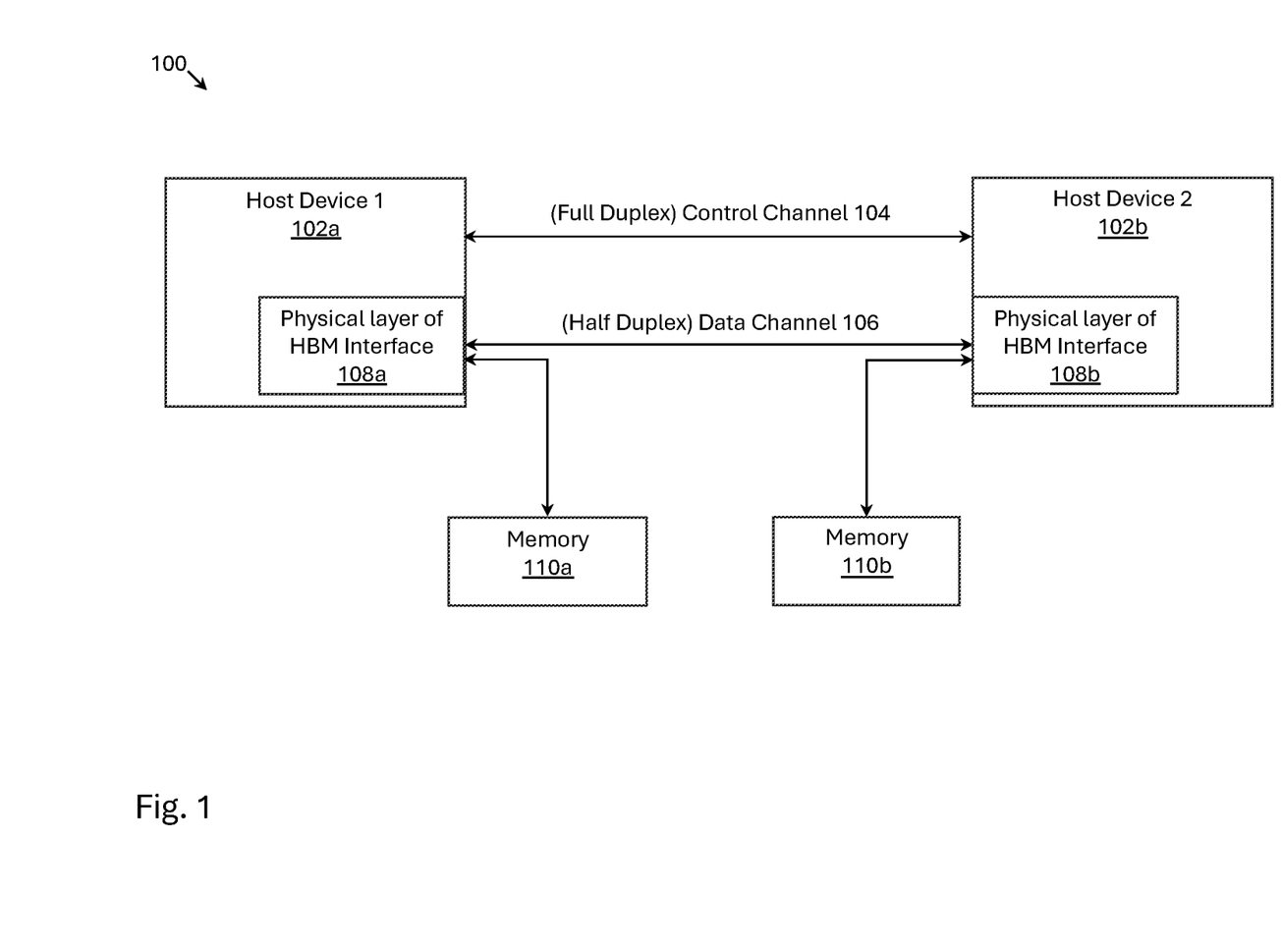
FIG. 1 depicts a system diagram with two host devices communicatively coupled to one another via a data channel and a control channel, in accordance with one embodiment of the invention.

FIG. 1 depicts system diagram 100 with host device 102a and host device 102b being communicatively coupled to one another via a data channel 106 and a control channel 104. In one embodiment, each of the host devices 102a, 102b may be instantiated as a chiplet. As is known in the art, a chiplet refers to an integrated circuit (IC) that is designed to perform one or more specialized functions (e.g., convolution operation, matrix multiplication, etc.). To minimize the length of interconnects between chiplets, multiple chiplets may be arranged on a common interposer and packaged together within a single package. In another embodiment, each of the host devices 102a, 102b may be instantiated as a microprocessor, a graphics processing unit (GPU), a central processing unit (CPU), a bus controller, a controller, an application specific integrated circuit (ASIC), a field programmable gate array (FPGA) or a switch. In another embodiment, host devices 102a, 102b may be instantiated as one or more of a microprocessor, a GPU, a CPU, a bus controller, a controller, an ASIC, an FPGA, a switch or a chiplet.

Each of the host devices may be implemented with the physical layer of a high bandwidth memory (HBM) interface, which provides the host device with a high bandwidth link to a corresponding memory (e.g., HBM dynamic random access memory (DRAM)). For example, host device 102a may include HBM interface 108a which provides host device 102a with a high bandwidth interface to memory 110a. Similarly, host device 102b may include HBM interface 108b which provides host device 102b with a high bandwidth interface to memory 110b. In one embodiment, the physical layer of the HBM interface may be repurposed to provide host-to-host (or chip-to-chip or chiplet-to-chiplet) communication between the host devices 102a, 102b. More specifically, the physical layer of the HBM interface 108a from host device 102a may be configured to transmit data to host device 102b or receive data from host device 102b via data channel 106. Similarly, the physical layer of the HBM interface 108b from host device 102b may be configured to transmit data to host device 102a or receive data from host device 102a via data channel 106. As is known in the art, there are many versions of the HBM interface (e.g., HBM2, HBM3, HBM3E, etc.). The term "HBM interface" is intended to refer to any of these existing versions of the HBM interface as well as future versions of the HBM interface.

The communication between the host devices 102a and 102b may be constrained by several operating conditions. First, the data channel 106 may be required to be a half-duplex channel, meaning that data (or other signals) can only flow in one direction at a time through data channel 106. If requests were to be sent by both host devices 102a, 102b at the same time via the half-duplex data channel 106, those requests could lead to a contention and an error would likely result. Second, the identity of the bus master, whether assigned to host device 102a or host device 102b, may change over time. Third, the data channel 106 may be a very high bandwidth channel (e.g., supporting the transmission of tens or hundreds of Gigabits per second). Fourth, the utilization or throughput of data channel 106 should be as high as possible, meaning that data channel 106 should not be left idle if there is data that is ready to be sent across data channel 106.

An analogy is now provided to better appreciate the above-described operating conditions. One may analogize data channel 106 to a ten lane (or other high number of lanes) freeway, which allows a one-way only flow and a high capacity of vehicle traffic at any moment in time. For instance, the freeway may carry northbound traffic or southbound traffic, but not northbound and southbound traffic at the same time. The engineering challenge is how to maximize the use of the ten lane freeway given dynamic traffic conditions. For instance, during the morning, there may be more northbound traffic and during the reverse commute in the evening, there may be more southbound traffic. In other words, the traffic engineer of the ten lane freeway is tasked with dynamically controlling the direction of traffic flow based on the current traffic conditions.

Extending the above analogy, one might imagine two people (e.g., two traffic engineers) stationed at either end (e.g., north end and south end of freeway) with walkie-talkies who are in charge of establishing the direction of traffic flow. Initially, the freeway may be used to carry northbound traffic (i.e., traffic traveling from south to north) only. At a later time, the person stationed at the north end may notice a large queue of cars waiting to use the freeway, and inform the person stationed at the south end (using the walkie-talkie) that it is time to change the direction of traffic flow. The person stationed at the south end may comply with the request to change the direction of traffic flow, halting the traffic flow at his/her end. The person stationed at the north end may observe when the last northbound vehicle has cleared the freeway before allowing the southbound traffic to use the freeway.

The particular coordination scheme employed in the context of FIG. 1 may differ from the above-described analogy, but one similar aspect is the use of the control channel 104 (analogous to the use of the walkie-talkie). Control channel 104 (also called a side-band channel) may be separate from data channel 106, and may be instantiated outside of the physical layer of the HBM interface. Furthermore, control channel 104 may be a full-duplex channel, meaning that information (e.g., control messages) may be communicated in both directions at the same time via control channel 104 without the concern for traffic collision.

The remainder of the description will describe in greater detail how control channel 104 is used to coordinate the direction of traffic flow via data channel 106 (or more precisely, which of the host devices will take on the role of bus master) based on the dynamic traffic conditions between the host devices 102a, 102b with the goal of achieving as high of a throughput as possible through data channel 106.

Figure 2A:
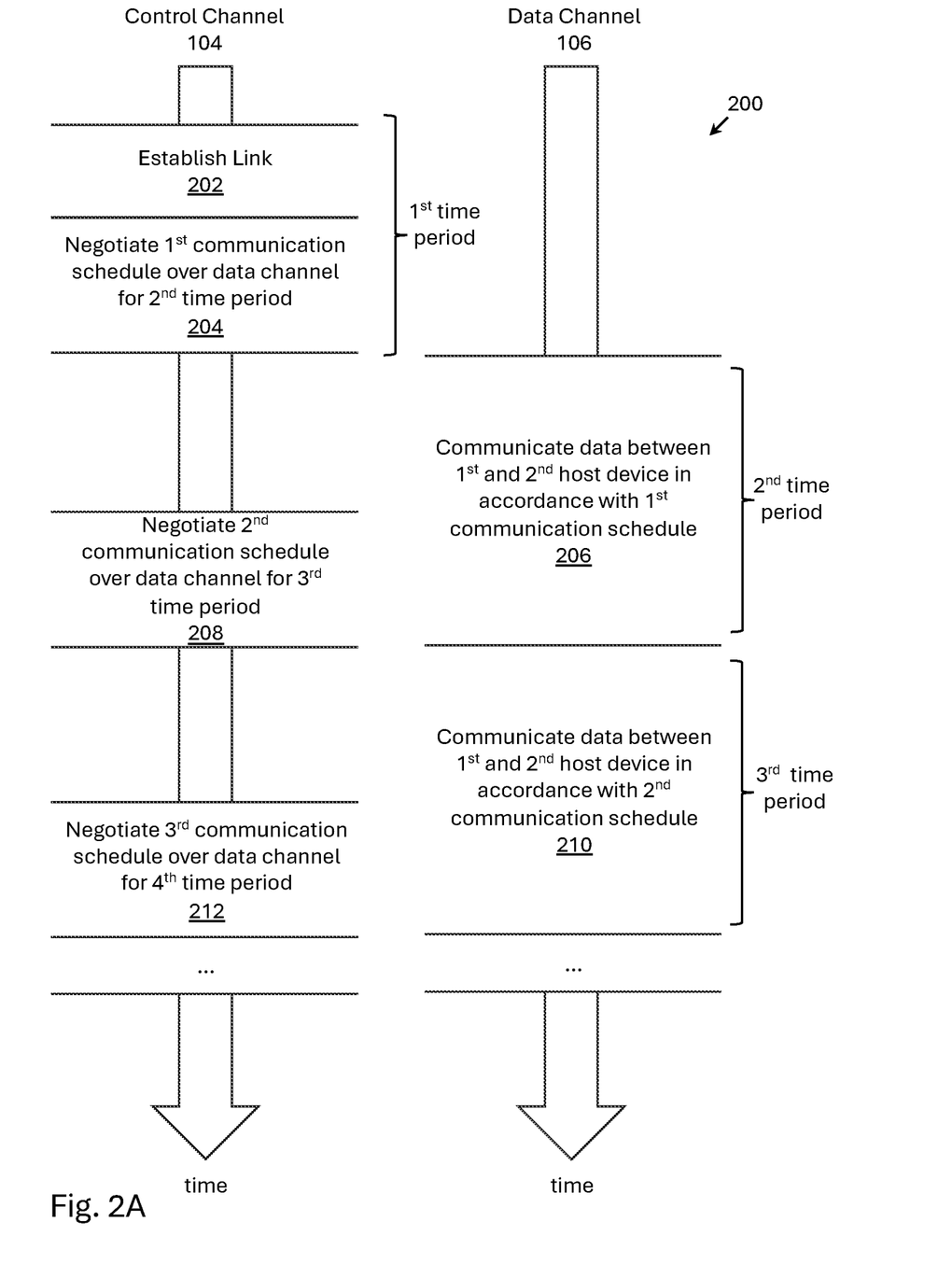
FIG. 2A depicts an example of a timing diagram of the communication that may occur over the control channel and data channel, in accordance with one embodiment of the invention.

FIG. 2A depicts an example timing diagram 200 of the communication that may occur over the control channel 104 and data channel 106. During a first time period, a link establishment procedure (step 202) and the arbitration of the role of bus master over the data channel 106 (step 204) may be carried out.

At step 202, host device 102a and host device 102b may communicate over the control channel 104 in order to establish a link. The time duration when step 202 is performed may be referred to as the link establishment phase, which is explained in more detail in FIG. 4. One of the important operations when establishing the link is to establish a common time reference between the host device 102a and host device 102b (step 402). In other words, 9:00 AM (or other time) at host device 102a should correspond to 9:00

Figure 4:
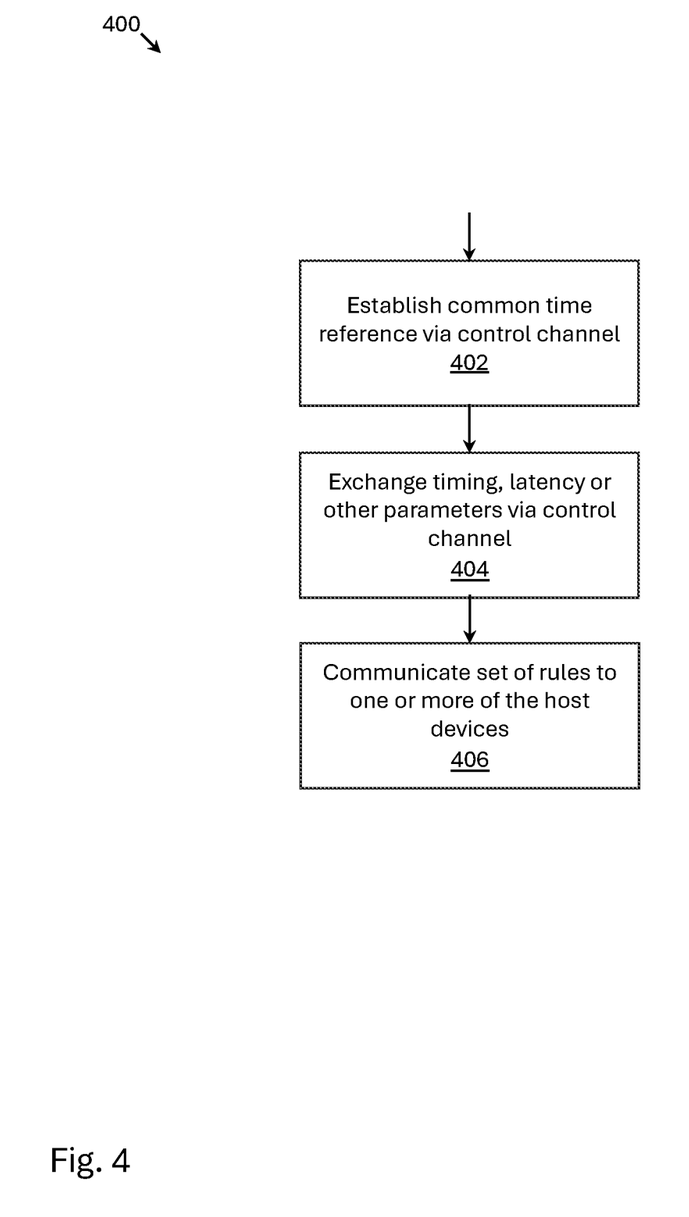
FIG. 4 depicts a flow diagram with additional details regarding the link establishment phase, in accordance with one embodiment of the invention.

AM (or other time) at host device 102b. During the link establishment phase, the host devices 102a, 102b may also exchange timing, latency or other parameters via the control channel 104 (step 404). Also during the link establishment phase, a set of rules may be communicated to one or more of the host devices 102a, 102b (step 406). Such a set of rules may be common between the host devices 102a, 102b and may be used by the host devices 102a, 102b to establish a communication schedule during the arbitration phase (described below).

Returning to FIG. 2A, an arbitration phase (during which step 204 occurs) may follow the link establishment phase. During step 204, the host devices 102a, 102b may negotiate a first communication schedule (also called a traffic flow pattern) over the data channel 106 for a second time period following the first time period. Additional details of step 204 may be found in FIGS. 5 and 6. Time division multiplexing (TDM) may be one example scheme that is employed in the first communication schedule.

A data communication phase (during which step 206 occurs) may follow the above-described arbitration phase. During step 206 (which may span a second time period), the host devices 102a, 102b may communicate data in accordance with the first communication schedule. Importantly, to maximize the throughput of the data channel 106 and prevent any pause in the use of data channel 106, a subsequent arbitration phase (during which step 208 occurs) may coincide with all or part step 206. In other words, when the host devices 102a, 102b are communicating data in accordance with the first communication schedule, the host devices 102a, 102b may already be planning the second communication schedule for the next time period (e.g., the third time period) following the second time period (step 208). To the extent that the data communication phase is longer than the arbitration phase (as is shown in the example of FIG. 2A), it should be apparent that there is some flexibility as to when the arbitration phase (i.e., step 208) occurs relative to the current data communication phase (step 206). Step 208 could occur near the beginning of step 206, during the middle of step 206 or near the end of step 206 (as shown in FIG. 2A). The scheme as shown in FIG. 2A may be most advantageous as the arbitration in step 208 can take into account the latest traffic conditions, as opposed to a scheme in which step 208 occurs closer to the beginning of step 206.

Continuing on in FIG. 2A, the process continues in a similar manner to the above-described process, so the description will be more succinct. During step 210 (which may span a third time period), the host devices 102a, 102b may communicate data in accordance with the second communication schedule. Importantly, to maximize the throughput of the data channel 106, a subsequent arbitration phase (during which step 212 occurs) may coincide with all or part step 210. In other words, when the host devices 102a, 102b are communicating data in accordance with the second communication schedule, the host devices 102a, 102b may already be planning the third communication schedule for the next time period (e.g., the fourth time period) following the third time period (step 212). The ellipsis in FIG. 2A indicates that the communication over the control channel 104 and data channel 106 may continue on in a similar fashion.

Figure 2B:
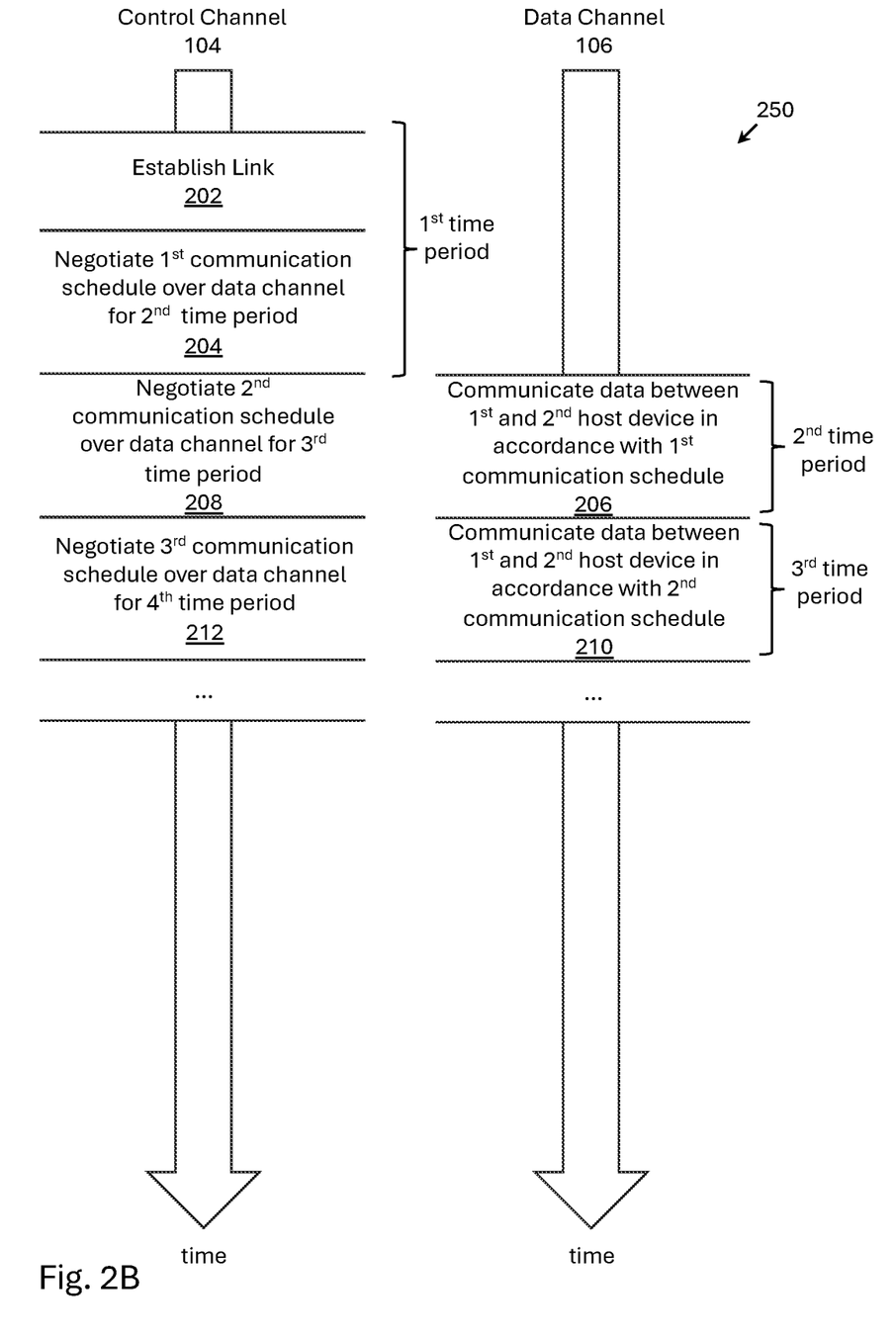
FIG. 2B depicts another example of a timing diagram of the communication that may occur over the control channel and data channel, in accordance with one embodiment of the invention.

FIG. 2B depicts a second example timing diagram 250 of the communication that may occur over control channel 104 and data channel 106. The second example illustrates one extreme end of the design space when each of the data communication phases is shortened to coincide with the maximum duration of the arbitration phase. The advantage of the scheme illustrated in the second example (with the shortened data communication phases) is that the communication schedules in each of the time periods can be highly adaptive to the current traffic conditions (i.e., the traffic conditions during each of the time periods). In contrast, if the traffic conditions are fairly stable, then the scheme illustrated in the first example in FIG. 2A may be more suitable in order to minimize the frequency that the arbitration is performed. In yet another scheme (not depicted), it is possible that a hybrid of the first and second schemes may be employed and in that hybrid scheme, the frequency that the arbitration is performed may adapt to the current traffic conditions (e.g., if the current traffic conditions are fairly stable, decrease the frequency of the arbitration and lengthen the data communication phase; if the current traffic conditions are highly variable, increase the frequency of the arbitration and shorten the data communication phase).

Figure 3:
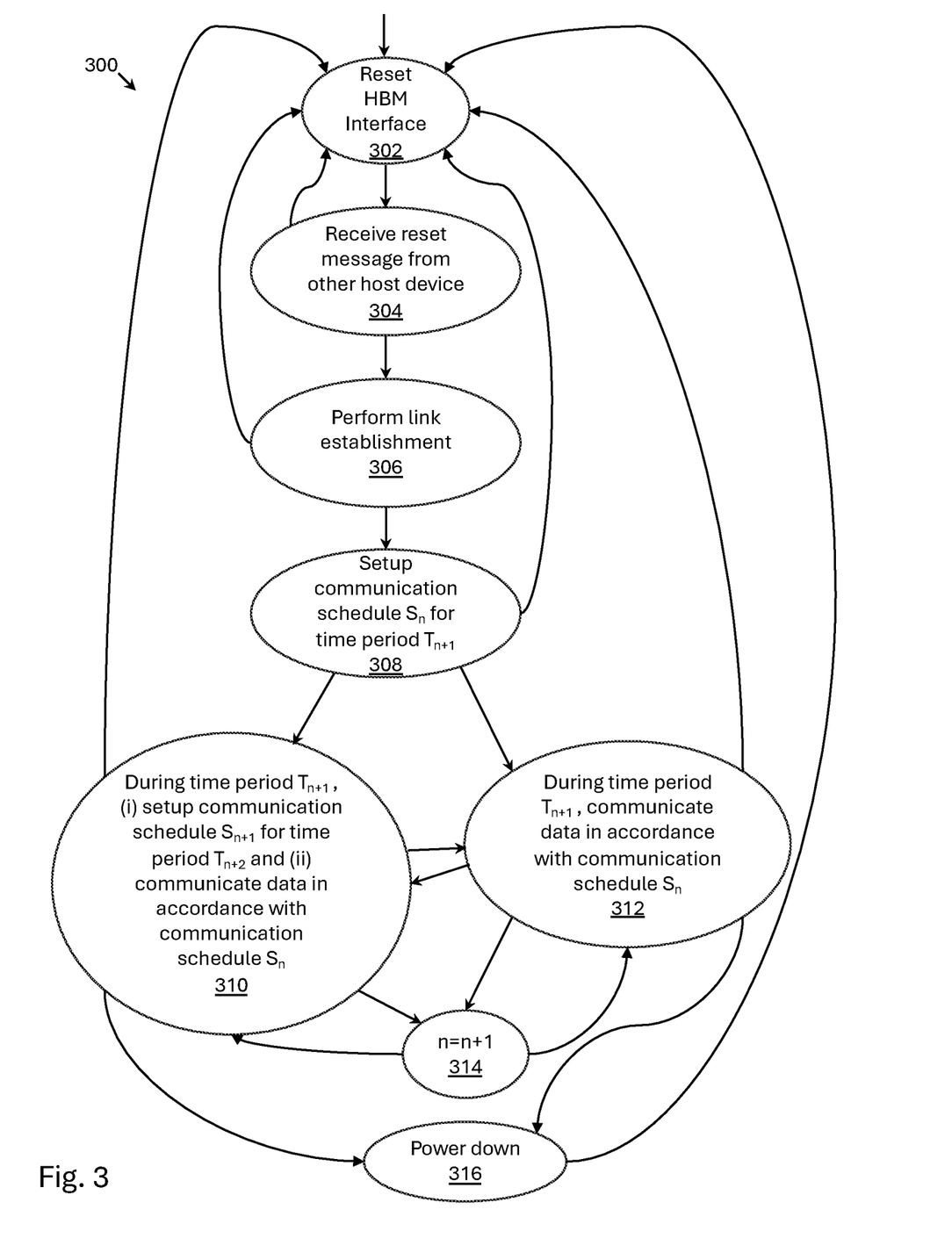
FIG. 3 depicts a state machine that describes the operation at one of the host devices, in accordance with one embodiment of the invention.

FIG. 3 depicts a state machine 300 that describes the operation at one of the host devices. For ease of explanation, the state machine 300 will be explained from the perspective of host device 102a, but the reader should understand how the description could be easily adapted to host device 102b. The initial state of the state machine 300 may be state 302, during which the physical layer of HBM interface 108a is reset. In state 302, host device 102a may transmit a message to host device 102b that alerts host device 102b that the physical layer of HBM interface 108a has been reset (or more simply, that alerts host device 102b that host device 102a is in a reset state).

Host device 102a may transition to state 304 upon the receipt of a message from host device 102b that alerts host device 102a that the physical layer of HBM interface 108b has likewise been reset (or more simply, that alerts host device 102a that host device 102b is in a reset state). Following state 304, host device 102a may transition to state 306, in which the link establishment procedure may be carried out. Following state 306, host device 102a may set up communication schedule $S_n$ for time period $T_{n+1}$. As should be understood, the index n may be initialized to an initial value (e.g., 1) during state 302. Additional details regarding the operations of state 308 may be found in FIGS. 5 and 6.

Following state 308, host device 102a may transition to either state 310 or state 312. In state 310, host device 102a may, during time period $T_{n+1}$, (i) setup communication schedule $S_{n+1}$ for time period $T_{n+2}$ and (ii) communicate data in accordance with communication schedule $S_n$. An example of such operation was illustrated in the latter portion of the first time period in FIG. 2A or during the entire first time period in FIG. 2B. In state 312, host device 102a may, during time period $T_{n+1}$, communicate data in accordance with communication schedule $S_n$. An example of such operation was illustrated in the earlier portion of the second time period in FIG. 2A.

Following state 310, host device 102a may transition to state 312. Such a transition is not illustrated in the examples of FIGS. 2A and 2B, but could occur near the end of step 208 if the arbitration of step 208 were to occur earlier in the second time period in FIG. 2A. Following state 310, host device 102a may transition to state 314, during which the index n is incremented. Such an operation occurs, for example, at the end of time periods two and three in FIGS. 2A and 2B.

Following state 312, host device 102a may transition to state 310. An example of such operation was illustrated at the start of step 208. Following state 312, host device 102a may transition to state 314, during which the index n is incremented. Such a transition is not illustrated in the examples of FIGS. 2A and 2B, but could occur at the end of time periods two or three if the arbitration of steps 208, 212 were to occur earlier in their respective time periods in FIG. 2A.

Following states 310 or 312, host device 102a may transition to state 316, during which the host device 102a may power down (e.g., to save power in response to a low battery condition, etc.). In state 316, host device 102a may transmit a message to host device 102b which alerts host device 102b that host device 102a is entering a low power state.

Following state 316, host device 102a may return to state 302. From any state (except for state 302), host device 102a may also return to state 302, in the event that host device 102a experiences an error condition (e.g., memory overflow, etc.). For ease of depiction, an edge was not depicted from state 314 to state 302, but such edge may be present in practice.

Figure 5:
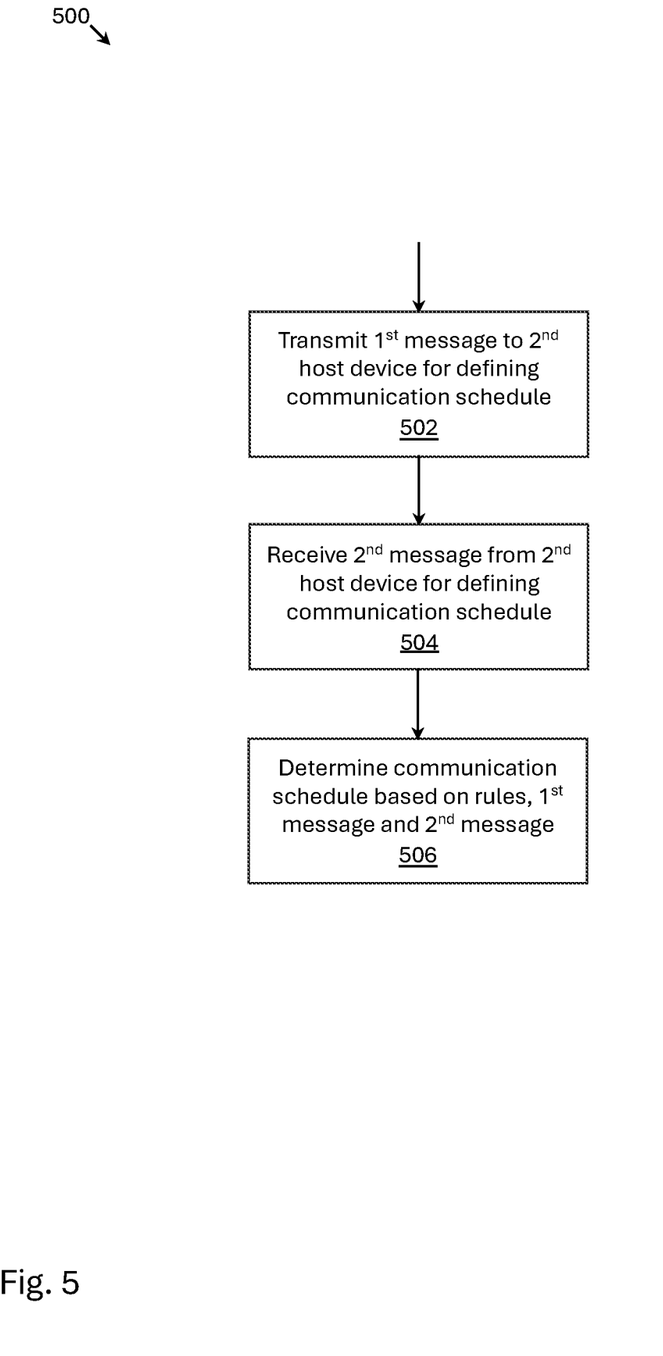
FIG. 5 depicts a flow diagram with additional details regarding the arbitration phase, in accordance with one embodiment of the invention.

FIG. 5 depicts flow diagram 500 with additional details regarding the steps performed by the host device 102a during the arbitration phase. It is expected that the reader will be able to modify the flow diagram 500 into the steps performed by the host device 102b. At step 502, host device 102a may transmit a first message to host device 102b for defining a communication schedule. The first message may include information regarding one or more of a current data load, a future data load, and a quality of service metric (e.g., maximum tolerable delay) at the host device 102a. At step 504, host device 102a may receive a second message from host device 102b for defining the communication schedule. The second message may include information regarding one or more of a current data load, a future data load, and a quality of service metric at the host device 102b. At step 506, the host device 102a may determine the communication schedule based on a set of rules (or also called a rule set), the first message and the second message. As previously discussed in connection with FIG. 4, the set of rules may be communicated to one or more of the host devices 102a, 102b during the link establishment phase (step 406). Alternatively and/or in addition, the set of rules may be stored on the firmware of one or more of the host devices 102a, 102b during a factory build process or a firmware update process (not depicted in the figures).

In one embodiment, the set of rules may be embodied in the form of a lookup table. For instance, a difference between the traffic load (e.g., traffic rate, data stored in a queue, etc.) at host device 102a and host device 102b may be computed, and the difference may be used as a key for a lookup table that maps various difference values (keys) to communication schedules (entries). As a simplified example, a difference of 100 MB may map to communication schedule 1, a difference of 0 MB may map to communication schedule 2 and a difference of –100 MB may map to communication schedule 3.

The set of rules may take into account a priority of transmission. Referring back to the analogy of the ten lane freeway, an ambulance or other emergency vehicle should be given higher priority over other vehicles. Similarly, a data packet, data message, etc. waiting to be sent from host device 102a that needs to be transmitted with minimal delay could result in the selection of a communication schedule that allocates earlier time slots to host device 102a and allocates later time slots to host device 102b.

If not already apparent, in the above-described arbitration scheme, the first and second messages may be the only messages that are communicated between the first and second host devices 102a, 102b in order to select the communication schedule for a future time period. The set of rules is assumed to be preexisting at the start of the arbitration phase, so the set of rules is not regarded as messages that are communicated between the first and second host devices 102a, 102b during the arbitration phase.

Another point worth noting is that the above-described arbitration scheme may not need to rely upon any "round trip" communication. In other words, in one embodiment, the determination of the communication schedule does not depend on the host device 102b replying to a message that is transmitted by the host device 102a. Similarly, in one embodiment, the determination of the communication schedule does not depend on the host device 102a replying to a message that is transmitted by the host device 102b. Such a point is more clearly explained in the timing diagram 600 depicted in FIG. 6.

Figure 6:
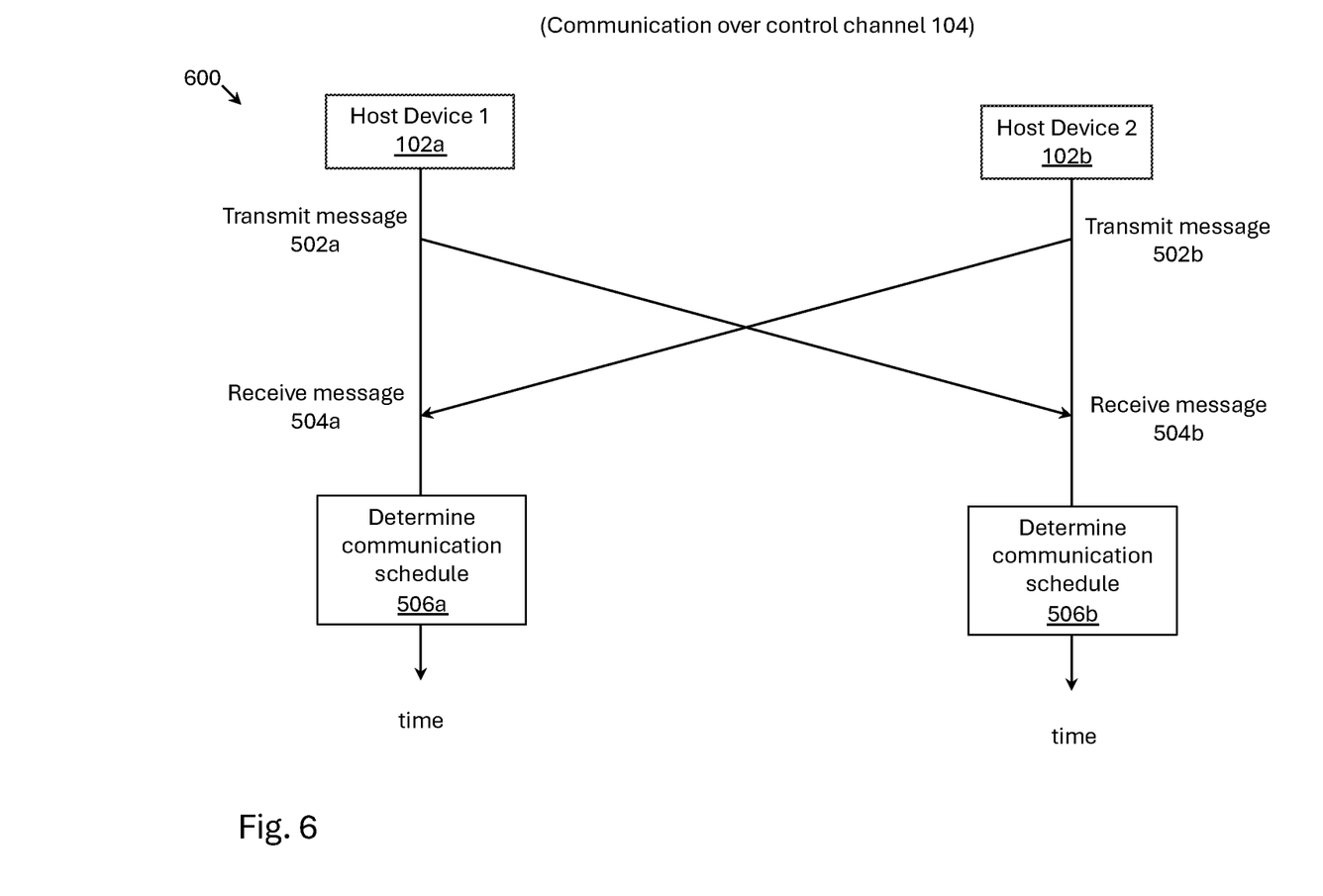
FIG. 6 depicts a timing diagram of the operations that may be performed by the first and second host devices during the arbitration phase, in accordance with one embodiment of the invention.

As shown in FIG. 6, the host device 102a may transmit its message (step 502a) before it receives the message from the host device 102b (step 504a). Likewise, the host device 102b may transmit its message (step 502b) before it receives the message from the host device 102a (step 504b). Such communication (as illustrated in steps 502a,b and 504a,b of FIG. 6) which does not depend on a "round trip" communication can be carried out with less delay than communication that does depend on a "round trip" communication (e.g., if the transmittal of message from the host device 102b (step 502b) were required to follow the receipt of the message from the host device 102a (step 504b)).

As should be apparent, the processes depicted at each of the host devices in FIG. 6 track the flow diagram 500 depicted in FIG. 5. At step 502a, the host device 102a may transmit a message to the host device 102b. At step 504a, the host device 102a may receive a message from the host device 102b. At step 506a, the host device 102a may determine a communication schedule based on a rule set, the message sent by the host device 102a in step 502a and the message received by the host device 102a in step 504a. Likewise, at step 502b, the host device 102b may transmit a message to the host device 102a. At step 504b, the host device 102b may receive a message from the host device 102a. At step 506b, the host device 102b may determine a communication schedule based on a rule set, the message sent by the host device 102b in step 502b and the message received by the host device 102b in step 504b.

The above-described arbitration scheme is now compared to the existing arbitration scheme of token passing, in which a token is passed between each of the host devices, and whichever host device has possession of the token assumes the role of bus master. In the above-described arbitration scheme, a block of time slots may be negotiated at once, during which the role of bus master may toggle back and forth between the first and second host devices. Such a scheme may be more advantageous when it is expected that the role of bus master needs to frequently toggle back and forth between the first and second host devices. In contrast, a token passing scheme may be more advantageous when the role of bus master is more stable, and thus requiring the token to be passed only occasionally.

Figure 7:
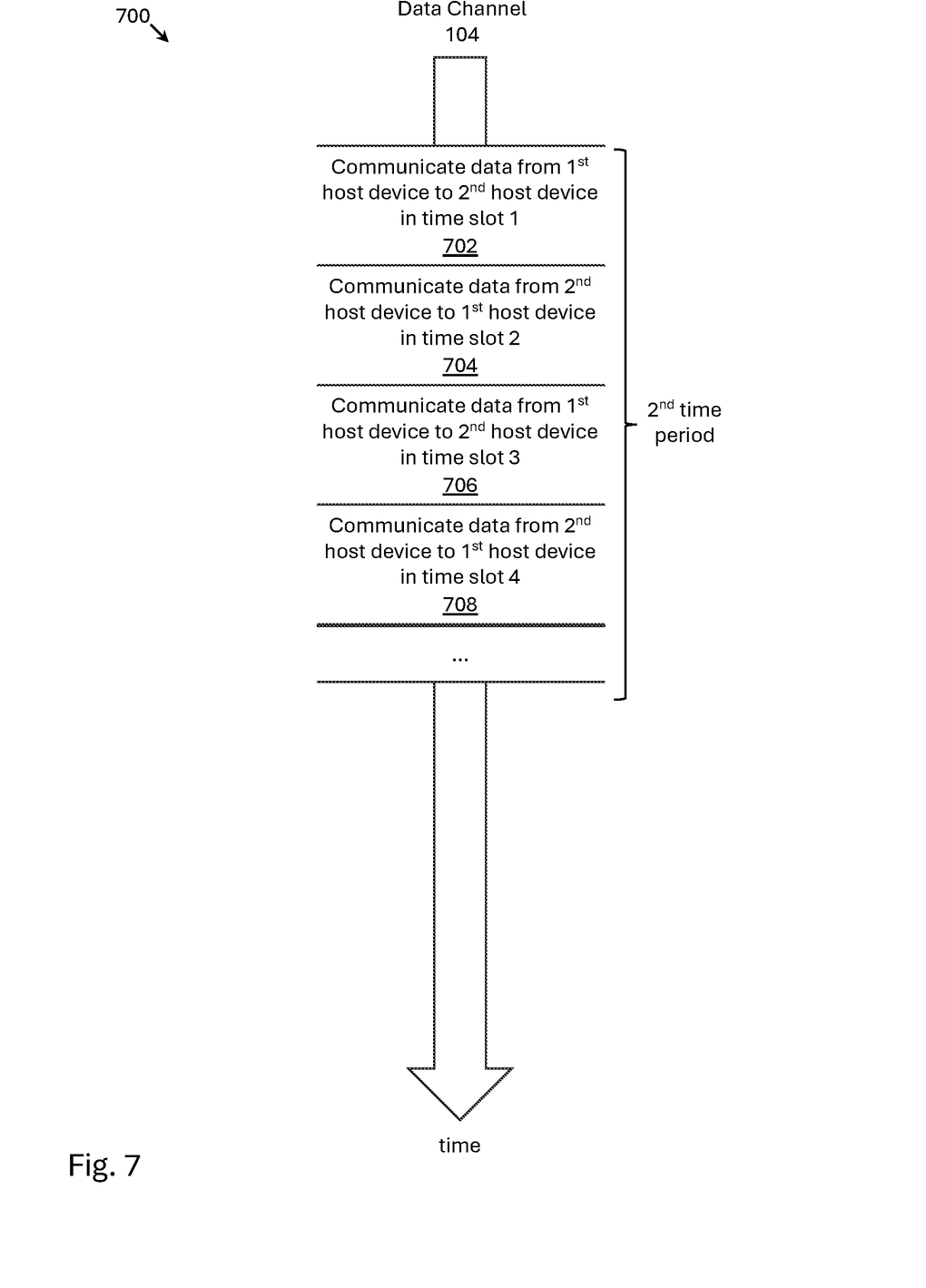
FIG. 7 depicts a timing diagram of the communication that may occur over the data channel during a data communication phase, in accordance with one embodiment of the invention.

FIG. 7 depicts an example timing diagram 700 of the communication that may occur over the data channel 106 during one time period (e.g., second time period) of the data communication phase. In a first time slot (step 702), the host device 102b may assume the role of bus master and cause data to be communicated from the host device 102a to the host device 102b. In a second time slot (step 704), the first host device 102b may assume the role of bus master and cause data to be communicated from the host device 102b to the host device 102a. In a third time slot (step 706), the host device 102b may assume the role of bus master and cause data to be communicated from the host device 102a to the host device 102b. In a fourth time slot (step 708), the host device 102a may assume the role of bus master and cause data to be communicated from the host device 102b to the host device 102a. The ellipsis indicates that the second period may include additional time slots which are not shown for the sake of conciseness. As should be apparent, the assignment of bus master during each of the time slots may be in accordance with the communication schedule negotiated during the previous (or the immediately preceding) arbitration phase.

Figure 8:
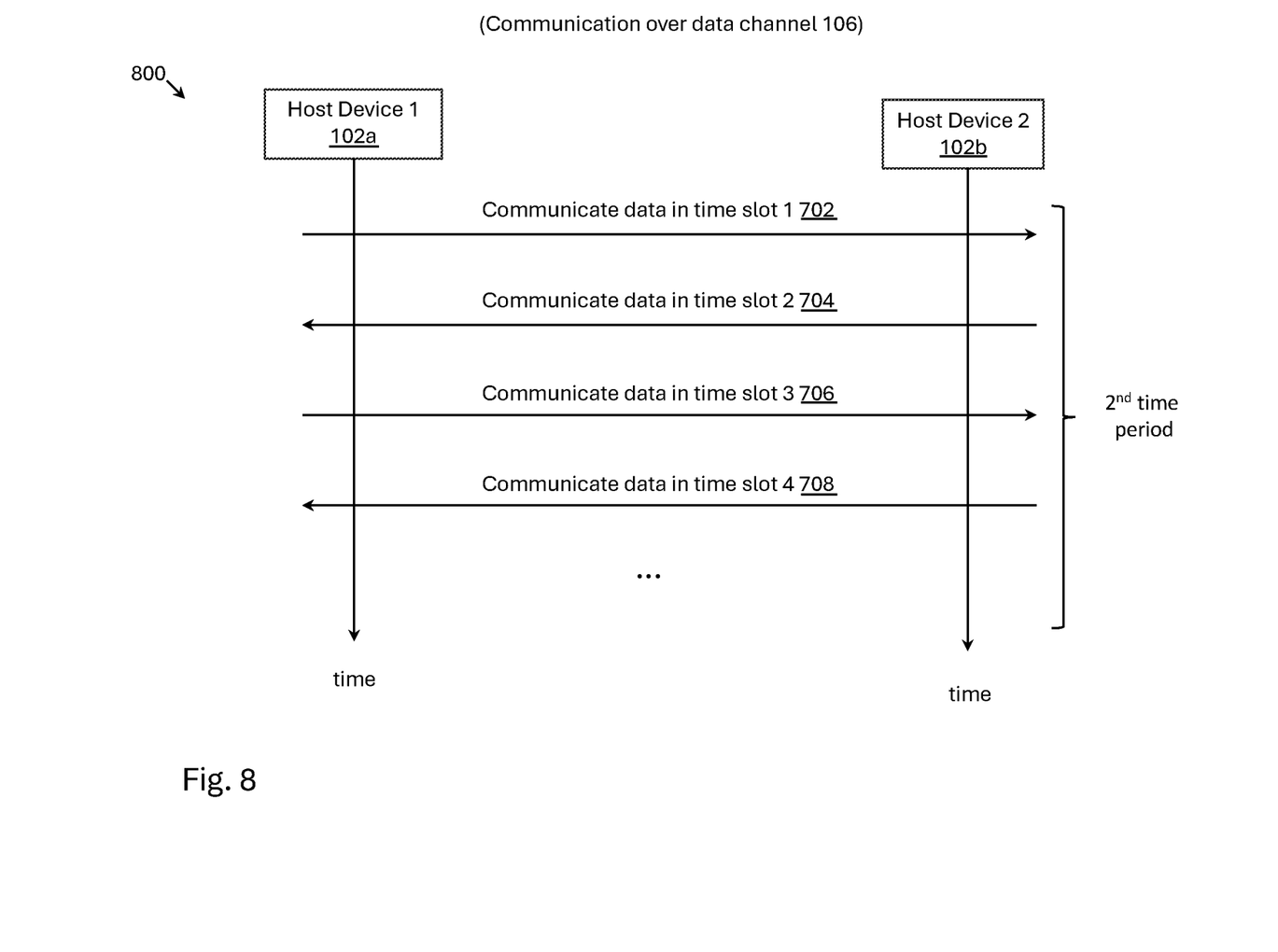
FIG. 8 depicts a timing diagram of the operations by the first and second host devices that may occur during the data communication phase, in accordance with one embodiment of the invention.

FIG. 8 depicts an example timing diagram 800 of the operations by the first and second host devices 102a, 102b during a one time period (e.g., second time period) of the data communication phase. In a first time slot (step 702), the host device 102b may assume the role of bus master and cause data to be communicated from the host device 102a to the host device 102b. To clarify, one or more requests (not shown) may be sent from the host device 102b to the host device 102a during the first time slot and data in response to these requests may be sent from the host device 102a to the host device 102b. For ease of illustration, the arrow from host device 102a to host device 102b only indicates the direction of data flow, but the direction of the requests (in the opposite direction) has not been depicted. In a second time slot (step 704), the first host device 102b may assume the role of bus master and cause data to be communicated from the host device 102b to the host device 102a. In a third time slot (step 706), the host device 102b may assume the role of bus master and cause data to be communicated from the host device 102a to the host device 102b. In a fourth time slot (step 708), the host device 102a may assume the role of bus master and cause data to be communicated from the host device 102b to the host device 102a. The ellipsis indicates that the second period may include additional time slots which are not shown for the sake of conciseness. As should be apparent, the assignment of bus master during each of the time slots may be in accordance with the communication schedule negotiated during a previous (or the immediately preceding) arbitration phase.

While the above discussion focused on techniques for arbitrating the role of master and slave within a networked arrangement of two host devices, it should be understood that the techniques could be extended to the arbitration of the roles of master and slave in a networked arrangement of two or more host devices, in which one of the host devices is (dynamically) assigned the role of master and the other host devices are (dynamically) assigned the role of slave.

Thus, methods for arbitrating the role of bus master among a plurality of host devices have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for communicating between a first host device and a second host device which are communicatively coupled to one another via a data channel and a control channel, the method comprising:

during a link establishment phase and via the control channel, establishing a common time reference between the first host device and the second host device;

during an arbitration phase following the link establishment phase and via the control channel:

transmitting, from the first host device to the second host device, a first message which specifies information for allocating one or more time slots to the first host device with respect to the common time reference during which the first host device will act as a bus master while communicating with the second host device via the data channel;

transmitting, from the second host device to the first host device, a second message which specifies information for allocating one or more time slots to the second host device with respect to the common time reference during which the second host device will act as the bus master while communicating with the first host device via the data channel; and based on a set of rules accessible to both the first host device and the second host device, the first message and the second message, determining, at each of the first and second host devices, a communication schedule which defines the one or more time slots allocated to the first host device and the one or more time slots allocated to the second host device, wherein the one or more time slots allocated to the first host device do not temporally overlap with the one or more time slots allocated to the second host device; and during a data communication phase following the arbitration phase and via the data channel, communicating data between the first host device and the second host device in accordance with the communication schedule.

2. The method of claim 1, further comprising: during the link establishment phase, communicating the set of rules to one or more of the first host device or the second host device via the control channel.

3. The method of claim 1, wherein the set of rules are stored on a firmware of the first host device and a firmware of the second host device.

4. The method of claim 1, wherein the information for allocating the one or more time slots in the first message includes one or more of a current data load, a future data load, and a quality of service metric at the first host device.

5. The method of claim 4, wherein the information for allocating the one or more time slots in the second message includes one or more of a current data load, a future data load, and a quality of service metric at the second host device.

6. The method of claim 1, further comprising, during the link establishment phase, transmitting via the control channel one or more parameters concerning timing or latency between the first host device and the second host device.

7. The method of claim 1, further comprising: transmitting, from the first host device to the second host device, a third message which alerts the second host device that the first host device plans to transition to a low power state; and transitioning to the low power state at the first host device.

8. The method of claim 1, further comprising: the first host device transitioning to a reset state; and transmitting, from the first host device to the second host device, a third message which alerts the second host device that the first host device has transitioned to the reset state.

9. The method of claim 1, wherein the first and second messages are the only messages that are communicated between the first host device and the second host device during the arbitration phase.

10. The method of claim 1, wherein the data channel is a half-duplex channel.

11. The method of claim 1, wherein the data channel is instantiated using a high bandwidth memory (HBM) physical interface.

12. The method of claim 1, wherein the control channel is a full-duplex channel.

13. The method of claim 1, wherein the data channel and control channel are separate from one another.

\* \* \* \* \*